United States Patent [19]

Poe

[11] Patent Number: 4,486,516
[45] Date of Patent: Dec. 4, 1984

[54] LOW SILHOUETTE VENTING SYSTEM FOR ELECTRIC STORAGE BATTERY

[75] Inventor: David T. Poe, Yorktown, Ind.

[73] Assignee: General Motors Corporation, Detroit, Mich.

[21] Appl. No.: 591,108

[22] Filed: Mar. 19, 1984

Related U.S. Application Data

[63] Continuation-in-part of Ser. No. 437,312, Oct. 28, 1982, abandoned.

[51] Int. Cl.³ .............................................. H01M 2/12
[52] U.S. Cl. .......................................... 429/82; 429/88
[58] Field of Search ................................ 429/87, 88, 82

[56] References Cited

U.S. PATENT DOCUMENTS

| | | | |
|---|---|---|---|
| 3,879,227 | 4/1975 | Hennen | 136/177 |
| 4,306,002 | 12/1981 | Heiser et al. | 429/88 |
| 4,371,591 | 2/1983 | Oxenreider et al. | 429/88 |
| 4,374,187 | 2/1983 | Sano | 429/88 |

FOREIGN PATENT DOCUMENTS 0100648  7/1980  Japan ..................................... 429/88

Primary Examiner—Donald L. Walton
Attorney, Agent, or Firm—Lawrence B. Plant

[57] ABSTRACT

A low silhouette horizontal-type venting system for an electric storage battery including an electrolyte drainage aperture(s) at one end of the system, an exhaust port at the other end of the system and an electrolyte trapping and refluxing chamber between the aperture(s) and port wherein the chamber is divided into an antechamber and a sump chamber having oppositely sloping floors leading downwardly to the drainage aperture. A narrow electrolyte upflow restricting slot(s) communicates the antechamber with the sump chamber. Baffles are provided in the sump chamber to inhibit electrolyte movement therethrough. Narrow channels are provided at the slot(s) and drainage aperture(s) for capillarily refluxing electrolyte back to the sump and cell, respectively.

17 Claims, 21 Drawing Figures

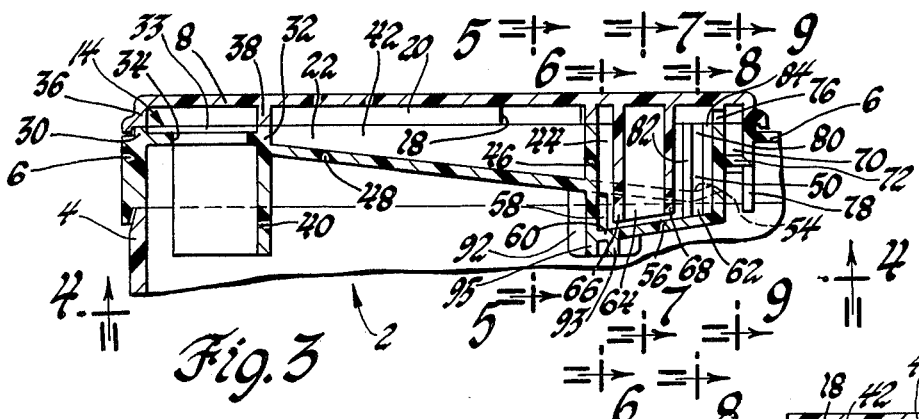
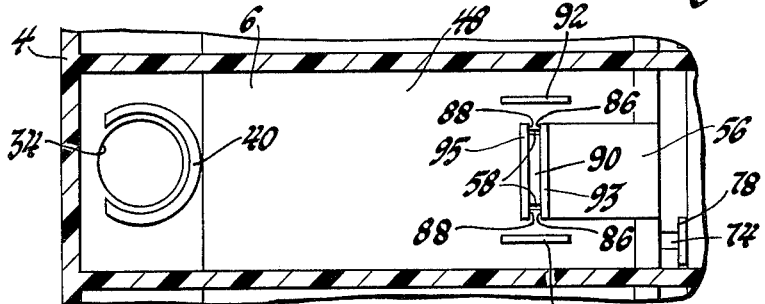
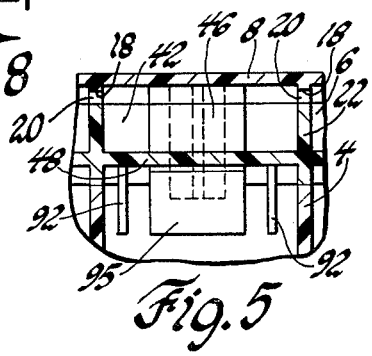
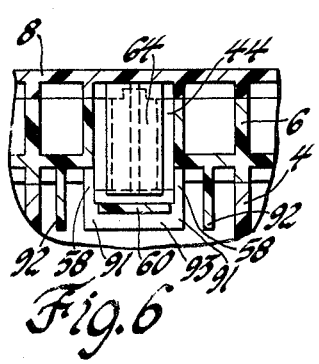
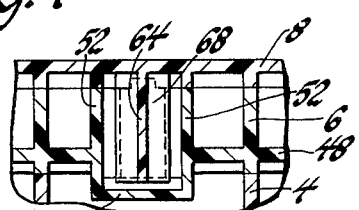
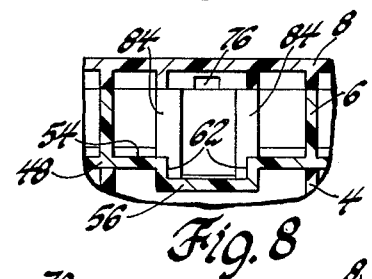
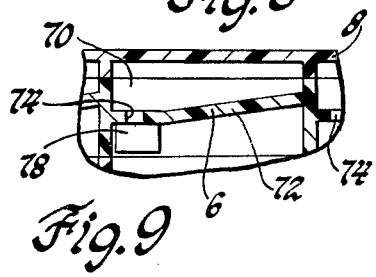
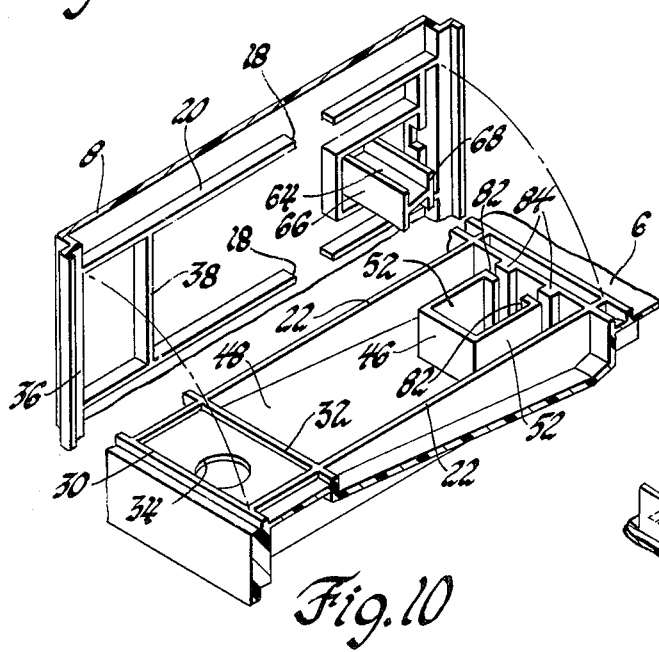
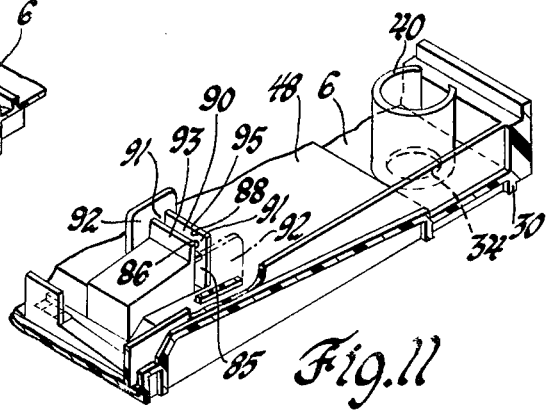

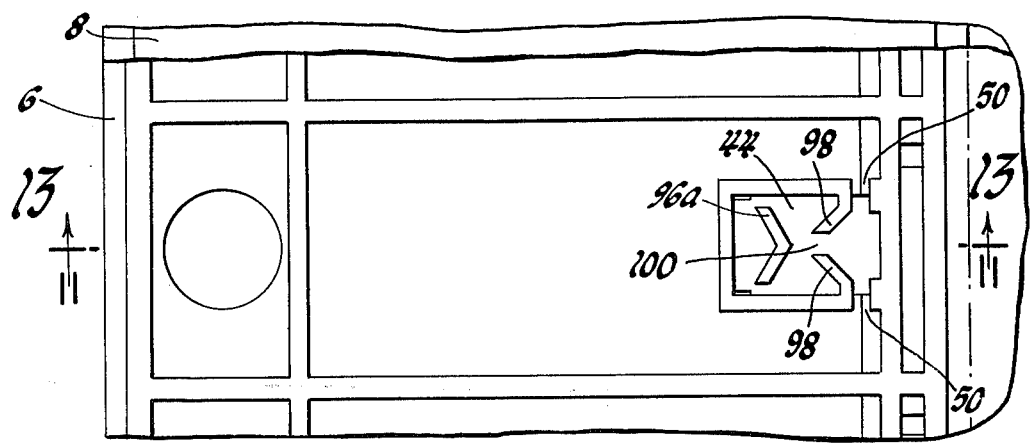
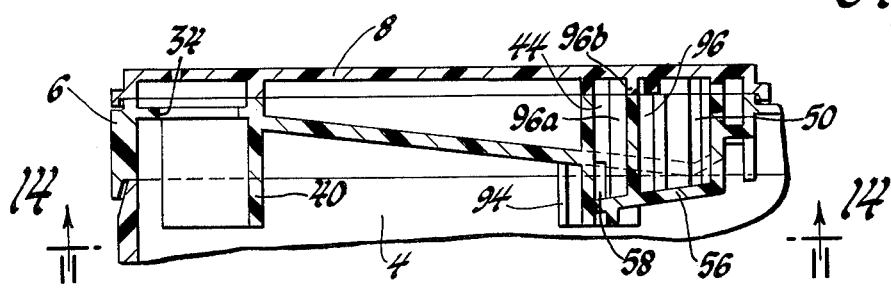
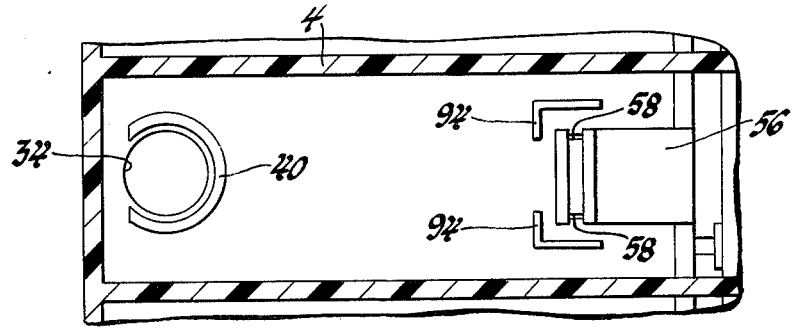
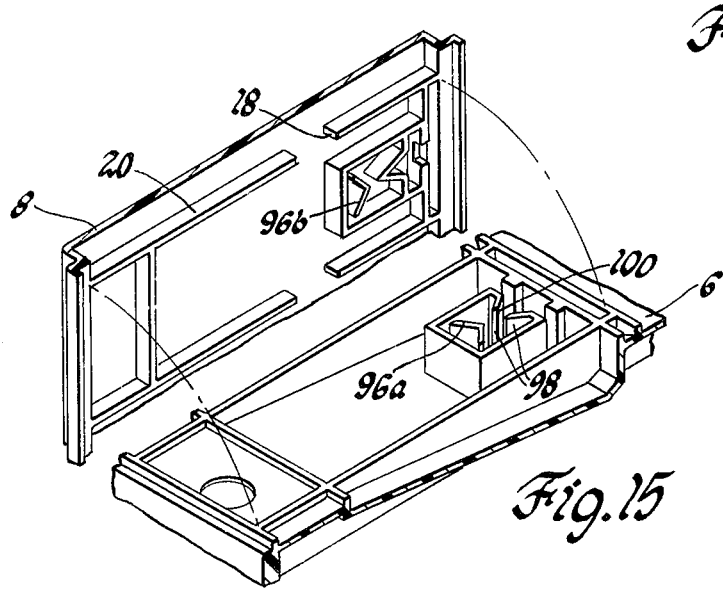

LOW SILHOUETTE VENTING SYSTEM FOR ELECTRIC STORAGE BATTERY

This is a continuation in part of application Ser. No. 437,312 filed on Oct. 28, 1982, now abandoned, and assigned to the assignee of the present invention.

This invention relates to electric storage batteries and more specifically to venting systems therefor.

BACKGROUND OF THE INVENTION

Pb-acid storage batteries, among others, generate gases during cycling. These gases are vented from the battery innards to the ambient via venting systems designed to permit gas passage but inhibit the outflow of electrolyte (i.e., from innards to ambient) therethrough. The trapped electrolyte is then drained back into the battery cells from whence it came.

There are essentially two types of battery venting systems commonly in use. These types can be classified as either vertical-type or horizontal-type depending on the orientation of the chamber used to trap the electrolyte. In this regard, both types typically include an electrolye trapping chamber which is located between a vent/drainage aperture that leads to the battery's electrochemical innards (i.e., plates, electrodes, separators, etc.) and an exhaust port which leads to the atmosphere. The venting/drainage aperture usually passes through the floor of the electrolyte trapping chamber and is sized to allow gas passage while minimizing entry of electrolyte splash into the trapping chamber. Nonetheless, the trapping chambers are commonly invaded by electrolyte passing up through the venting/drainage aperture as a result of excessive overcharging, sloshing, splashing, etc. (i.e., due to mishandling, vibration, tilting, or the like).

To substantially prevent electrolyte from exiting the battery, trapping chambers are typically equipped with a variety of baffles or the like to inhibit electrolyte mobility and substantially prevent its reaching the exhaust port and escaping to the ambient. Sloping chamber floors are typically used to facilitate draining back (i.e., refluxing) of the electrolyte into the cell through the same aperture from whence it came.

Discrete vent plugs found on many batteries exemplify vertical-type vent systems. The plugs typically include a deep, cylindrical chamber which fits tightly into the filler well of the battery. Separation of the electrolyte from the gas occurs primarily by gravity as the gases rise vertically through the cylindrical chamber and the heavier electrolyte falls to the chamber floor. The floor of the chamber slopes toward a central aperture through which the gases can pass upwardly and the electrolyte can drain back into the cell. The top of the chamber has an exhaust port for discharging the gases to the atmosphere. The chamber may also contain a variety of internal baffles to prevent electrolyte from reaching the exhaust port.

Horizontal-type vent systems, on the other hand, are most frequently formed integrally with the battery cover and typically include an elongated chamber extending horizontally across at least part of the top of the battery. The vent/drainage aperture is usually located laterally and elevationally remote from the exhaust port, and the gases passing through the vent/drainage aperture horizontally traverse much of the length of the chamber before discharge to the ambient. Such designs frequently employ a manifolding arrangement whereby several trapping chambers share a single exhaust port. One such horizontal-type system is disclosed in my copending U.S. patent application Ser. No. 305,096, which was filed on Sept. 24, 1981 and is assigned to the assignee of the present invention.

Horizontal-type venting systems are generally more susceptible to electrolyte leakage than vertical systems. In this regard, the substantial loss of the benefits of gravity, the wettability of the surfaces defining the electrolyte-trapping chamber, and the ability of the electrolyte to move more readily through horizontal chambers (i.e., incident to vibration, jostling and surface tension affects) substantially increase the risk of electrolyte reaching and escaping the exhaust port. In order to minimize this leakage, the trapping chambers have been made relatively deep and thereby add non-productive height to the battery. Unnecessarily tall SLI batteries are particularly undesirable in modern times where the trend toward smaller vehicles dictates the need for smaller batteries. Likewise more leak proof SLI batteries are desirable not only to conserve electrolyte and prevent corrosion of vehicular parts, but also to permit location of the battery in a vehicle at sites not readily available for convenient battery maintenance.

It is an object of the present invention to provide a low-silhouette, horizontal-type venting system having manifestly improved electrolyte trapping and refluxing characteristics. This and other objects and advantages of the present invention will become more readily apparent from the detailed description thereof which follows.

BRIEF DESCRIPTION OF THE INVENTION

The present invention comprehends an elastic storage battery having a low silhouette, horizontal-type, compartmentalized, electrolyte-trapping, battery gas venting system formed integrally with the battery container's cover. The venting system includes a gas exhaust port at one end, an electrolyte vent/drainage aperture at the other end, a dual compartment electrolyte trapping/refluxing chamber therebetween, and an electrolyte outflow restricting opening joining the two compartments. The compartmented trapping/refluxing chamber includes an antechamber proximate the exhaust port, a sump proximate the vent/drainage aperture, a plurality of substantially vertical partitions separating the sump from the antechamber and a narrow, electrolyte-restrictive (i.e., outflowwise) opening or openings in the partition(s) to provide gas/electrolyte flow communication between the antechamber and the sump.

The antechamber is defined in part by a canting floor which slopes downwardly away from the exhaust port and toward the sump. At substantially the low point of the canting floor, a small opening(s) [preferably a narrow vertical slot(s)] is/are provided in the partition(s) separating the antechamber from the sump. The slot(s) concurrently permit(s) gases to flow from the sump to the antechamber and electrolyte to flow from the antechamber back to the sump but restricts electrolyte entry into the antechamber from the sump. Preferably two such slot(s) are located in opposed partitions lying substantially perpendicular to the floor of the antechamber and parallel to the direction that the floor slopes. Not only do two (2) slots more quickly remove accumulated electrolyte for reduced sloshing in the antechamber, but when located in the slope-paralleling partitions, any electrolyte that might pass up through the slot(s) must first make a sharp turn (i.e., 90°) before it can traverse the antechamber toward the exhaust port.

The sump is defined by an inclined floor as well as by the portions of the partitions which separate it from the antechamber. The inclined floor lies beneath the antechamber floor and slopes in a substantially different (preferably opposite) direction to that of the canting antechamber floor. The antechamber and sump floors are so spaced apart at the restrictive opening(s) as to provide a riser therebetween which still further impedes electrolyte passage from the sump to the antechamber. A venting/drainage aperture(s) at substantially the low point of the inclined floor communicate(s) the sump with the innards of the cell. For maximum protection against leakage, there will be two (2) aperture(s) (preferably vertical slots) in the opposing vertical partition(s) separating the sump from the innards. The two slots not only drain the sump more quickly to reduce sloshing therein but their positioning in the vertical partitions (i.e., in contrast to through the floor) even further reduces entry of electrolyte into the sump through the apertures.

The combination of two separate compartments (i.e., antechamber and sump) having floors sloping in different directions and communicating one with the other only by means of an electrolyte restrictive opening (e.g., a narrow vertical slot) alone substantially impedes the movement of electrolyte from the drainage aperture to the exhaust port. In a preferred embodiment, however, a baffle(s) will also be positioned in the sump transverse the direction of electrolyte flow from the drainage aperture to the restrictive opening between the sump and the antechamber in order to deflect/divert the electrolyte and thereby further deter any electrolyte from making the journey from the aperture to the antechamber-sump slot(s).

In accordance with a further feature of the present invention, the aforesaid compartmented venting system will also include means for capillarily refluxing electrolyte from the antechamber to the sump and/or from the sump to the innards. The addition of capillary refluxing means to the antechamber-sump slot(s) and the sump-innards aperture(s) provides better drainage for the respective floors even when relatively narrow slots and vertically elongated aperture(s) are used. By way of constrast, very small symmetrical opening(s)/aperture(s) are not normally conducive to optimum drain back of the electrolyte. In this regard, the surface tension between the electrolyte and the edges of the symmetrical opening(s)/aperture(s) tends to create a liquid plug which holds back the electrolyte until such time as a sufficient head of electrolyte can accumulate on the floor to overcome that surface tension. The use of capillary refluxers at the opening(s)/aperture(s) alleviates this problem and the use of vertically oriented slots or elongated apertures therewith virtually eliminates the problem. Hence and in accordance with a preferred embodiment of the present invention, narrow capillary refluxing channels are positioned contiguous the innards-side of the sump-to-antechamber slot(s) and/or the sump-to-innards aperture(s). This refluxing channel, like a capillary tube, uses surface tensions to effectively pull or draw the electrolyte through the slot(s) or aperture(s) and discharge it at its low end to the sump or innards respectively—hence the term "capillarily refluxing" the electrolyte. At the antechamber-to-sump slot(s) the capillary refluxing channel extends from the floor of the antechamber to the floor of the sump along the riser between the floors.

In one particularly effective construction, the sump is provided with two opposing vertical drainage slots, one in each of the opposed vertical partitions defining the sump and separating it from the innards. Each drainage slot is provided with its own vertical capillary refluxing channel on the innards side of the aperture and the lowermost ends of these channels are joined together by a horizontal channel having substantially the same width as the vertical channels. The horizontal channel enhances the refluxing action of the two vertical channels by capillarily consolidation their respective flows into a single droplet for quicker return to the innards than would otherwise occur if two separate droplets were formed.

DETAILED DESCRIPTION OF SPECIFIC EMBODIMENTS

This invention may be better understood when considered in the light of the following detailed description of certain specific embodiments thereof, which description is given in conjunction with the several drawings in which:

FIG. 3 is a side, sectioned view taken in the direction 3—3 of FIG. 2;

FIG. 4 is a bottom, sectioned view taken in the direction 4—4 of FIG. 3;

FIG. 5 is a front, sectioned view taken in the direction 5—5 of FIG. 3;

FIG. 6 is a front, sectioned view taken in the direction 6—6 of FIG. 3;

FIG. 7 is a front, sectioned view taken in the direction 7—7 of FIG. 3;

FIG. 8 is a front, sectioned view taken in the direction 8—8 of FIG. 3;

FIG. 9 is a front, sectioned view taken in the direction 9—9 of FIG. 3;

FIG. 10 is an exploded, isometric view of the venting system of FIGS. 1–9;

FIG. 11 is an isometric view of the underside of the venting system of FIGS. 1–10;

FIG. 12 is an enlarged, partially broken away, plan view like that of FIG. 2, but of another, and preferred, embodiment of the invention;

FIG. 13 is a side, sectioned view, taken in the direction 13—13 of FIG. 12;

FIG. 14 is a bottom, sectioned view taken in the direction 14—14 of FIG. 13;

FIG. 15 is an exploded, isometric view, like that of FIG. 10, but of the embodiment of FIGS. 12-15;

Structure common to all embodiments (i.e., FIGS. 1–11, FIGS. 12–15 and FIGS. 16–21) described herein are designated by the same numerals in all Figures.

Figure 1:
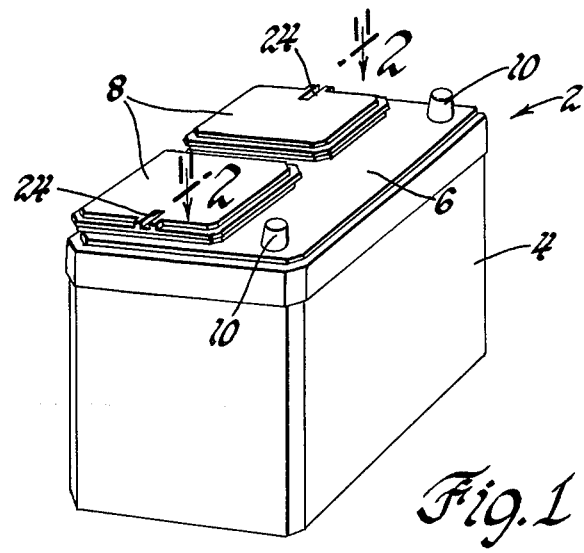
FIG. 1 is an isometric view of a battery having two, horizontal-type, venting manifolds each servicing three of the battery's six cells.

FIG. 1 depicts a lead-acid, SLI battery 2 having a container 4, and intermediate cover 6 and final covers 8 each enclosing three separate venting systems molded into the intermediate cover 6. The container 4 defines six individual cell compartments each housing one of six series connected cells for providing a 12-volt potential at the terminals 10. Each cell has its own individual venting system, though the several systems are manifolded together, in sets of three, and share a common flame arrestor 26.

Figure 2:
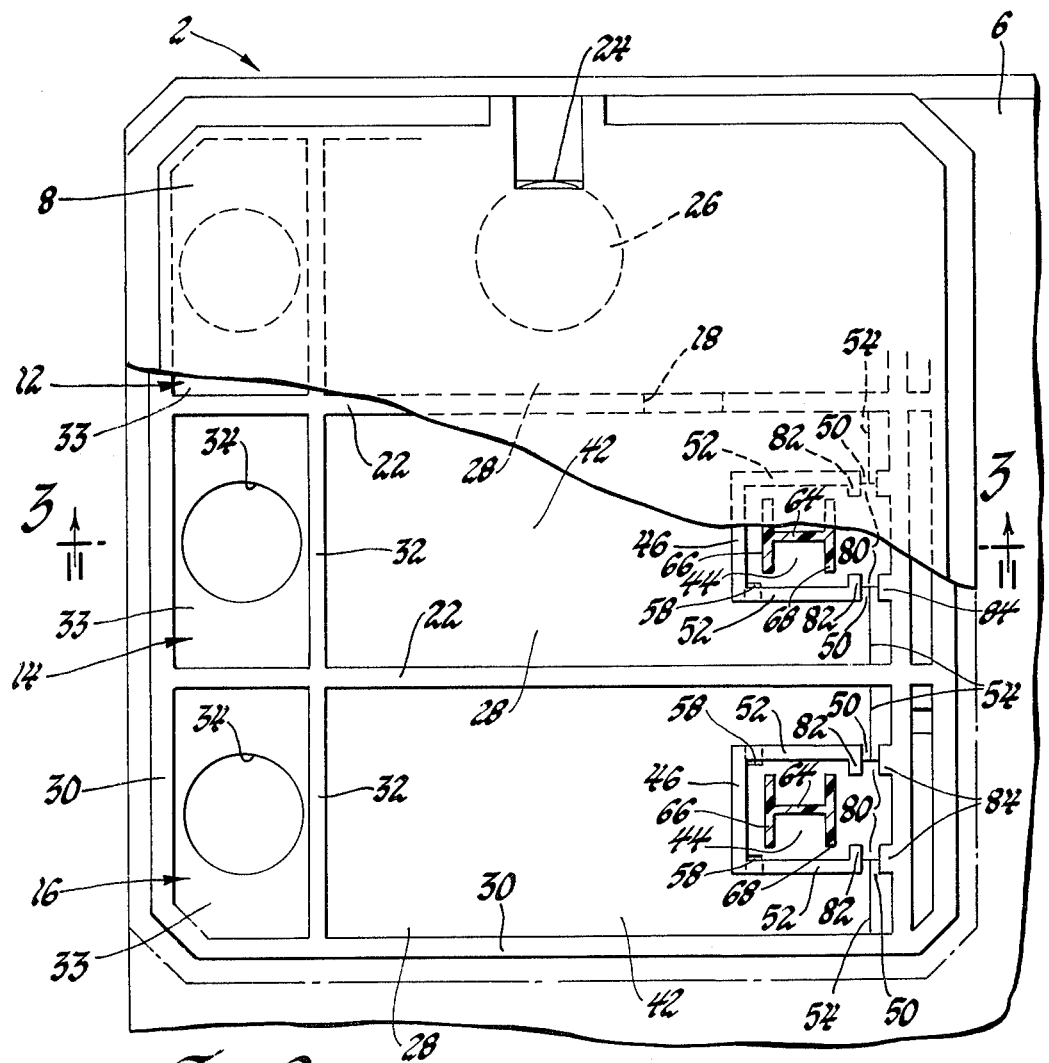
FIG. 2 is an enlarged, partially broken away, plan view of one of the venting manifolds of FIG. 1.
Figure 16:
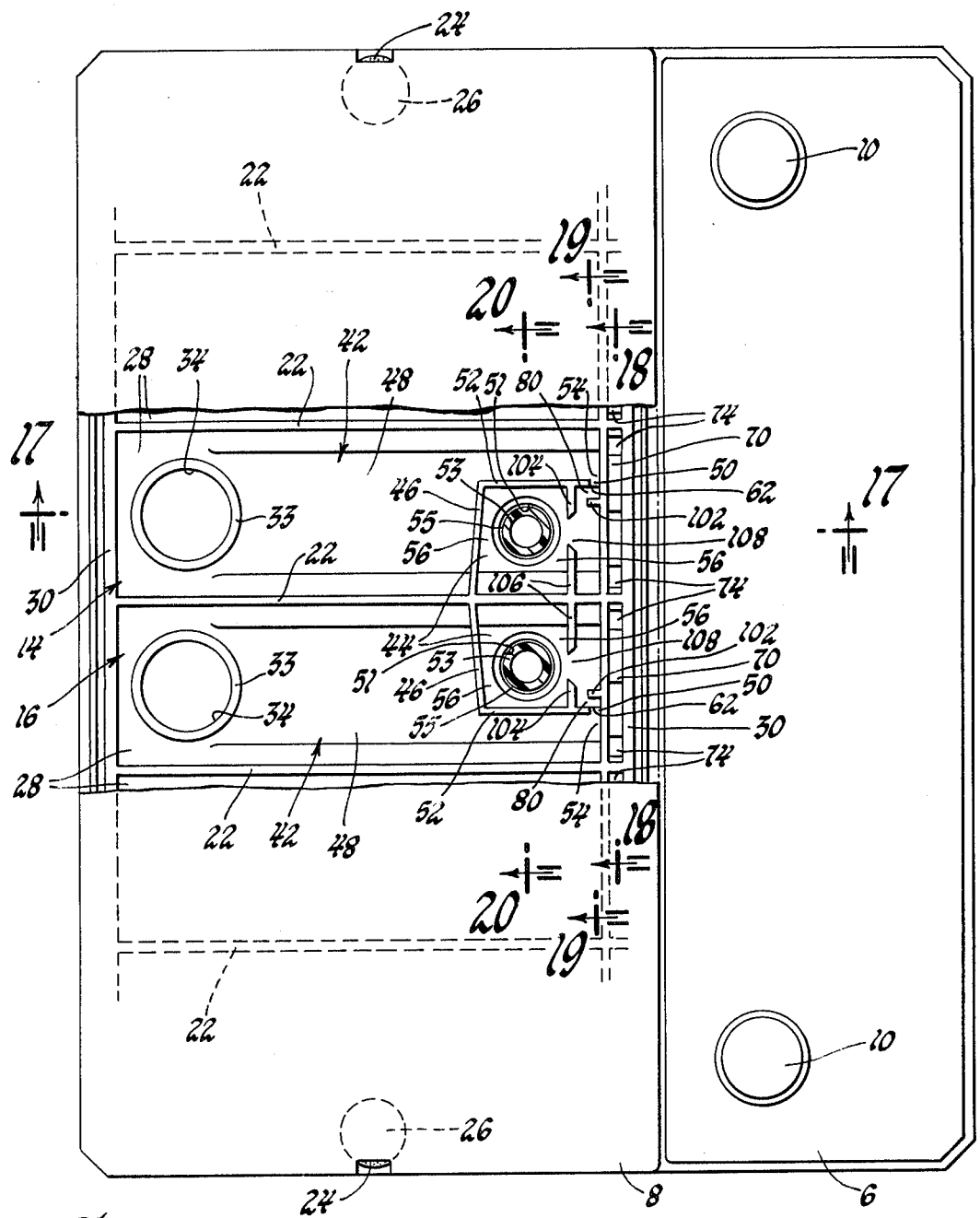
FIG. 16 is a partially broken away, plan view of a battery like that shown in FIG. 1, but having a single, horizontal-type venting manifold servicing all six cells of the battery.
Figure 17:
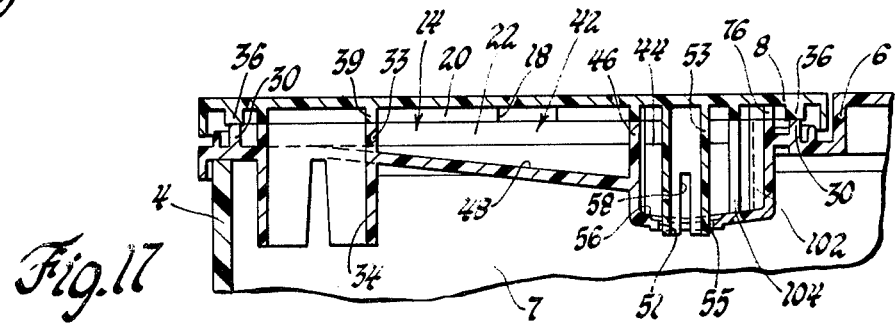
FIG. 17 is a side, sectioned view taken in the direction 17—17 of FIG. 16.

FIGS. 2–11 show one embodiment of a venting system made in accordance with the present invention. The intermediate cover 6 includes an upstanding wall 30 which defines the periphery of a rectangular enclosure for housing three of the battery's venting systems 12, 14, and 16. The wall 30 is heat sealed to depending peripheral flange 36 on the final cover 8 to complete the enclosure. Ridges 22 upstanding from the intermediate cover divide the enclosure into three sections 28 each overlying an individual cell. In this regard and as best shown in FIGS. 2 and 3, each cell has its own venting system 12, 14 or 16 which extends horizontally across the top of its associated cell. The several systems each exhaust and communicate, one with the other and the flame arrestor 26, via small notches 18 formed in the depending ridges 20 of cover 8. During assembly, the ridges 20 are heat sealed to the upstanding ridges 22 on the intermediate cover 6 and together define septums which separate the individual venting systems one from the other. The notches 18 remain unsealed and insure that the three otherwise separate venting systems 12, 14 and 16 may all share a common atmospheric exhaust port 24 contiguous the flame arrestor 26. Short wall segments 32, between the ridges 22 and the peripheral wall 30, divide the sections 28 into an electrolyte filler portion 33 and a venting system portion 42 (hereafter "antechamber") of the venting chamber. Transverse ridges 38 on final cover 8 are heat sealed atop the ridges 32 to totally isolate the electrolyte filler portion 33 from the antechamber 42. The electrolyte filler portion 33 includes a hole 34 through which electrolyte is added to the battery before assembly of the final cover 8. A semi-cylindrical skirt 40 depends from the intermediate cover 6 adjacent the filler hole 34 to minimize electrolyte splash-back into the filler portion 33 especially during filling.

The dual compartment venting chamber comprises an antechamber 42 and a sump 44 separated one from the other by a frontal partition 46 and lateral partitions 52. The antechamber 42 has a canting floor 48 which slopes downwardly toward the sump 44. Narrow, electrolyte outflow restricting slots 50 are provided in the opposed lateral partitions 52 which lie substantially parallel to the direction the canting floor 48 slopes. These slots 50 are located at substantially the low point 54 of the canting floor 48 to return any electrolyte in the antechamber back to the sump while still permitting the gases to concurrently vent therethrough. The slots 50 are preferably about 2.5 mm wide. The sump 44 lies beneath the antechamber 42, is defined by the partitions 46 and 52 and also includes an inclined floor 56 which slopes in the opposite direction to the canting floor 48. At the slots 50, the inclined floor 56 is spaced from the canting floor 48 by a short distance so as to provide a riser 62 in the opposed lateral partitions 52. Narrow venting/draining slots 58 are provided in the lateral partitions 52 at substantially the low point 60 of the floor 56 to vent the gases and return any electrolyte in the sump back to the innards. The narrow vertically oriented slots 50 and 58 are preferred to small isometric openings/apertures since, under normal usage, gases may escape through the top of the slots while electrolyte refluxes through the bottom thereof without substantially plugging the slots with liquid.

An integral, H-shaped baffle 64 depends from the final cover 8 into the sump 44 and into close proximity to the inclined floor 56. Flange portions 66 and 68 of the H-shaped baffle 64 lie transverse the direction that the floor 56 slopes and serve to divert or deflect the upward flow of splashing or sloshing electrolyte in the sump 44.

An air-bleed system (as best shown in FIG. 9) lies adjacent the sump 44. The air-bleed system includes a trough 70 having a sloping floor 72 which terminates in an air-bleed hole 74 at its low end. A vent hole 76 above the trough opens into the sump 44. The air-bleed system allows gas/air to escape from the cell compartment while electrolyte is refluxing through the apertures 58 or the battery is being filled. Any electrolyte that might splash into the trough 70 will drain down the sloping floor 72 and back to the cell through the air-bleed hole 74. A depending baffle 78 is provided immediately adjacent the air-bleed hole 74 to minimize electrolyte entry into the air-bleed trough 70 from the innards of the battery.

Opposed walls 82 and 84 are provided immediately adjacent the antechamber-sump slots 50 and defined capillary reflux channels 80. The opposed walls 82 and 84 are spaced sufficiently close together (i.e., about 2.5 mm) to capillarily draw any electrolyte from atop the floor 48 downwardly to the floor 56 of the sump 44. These walls 82, 84 extend the full height of the vertical slots 50, down along the riser portion 62 of the partition 52 and into engagement with the floor 56. Similarly, the venting/draining slots 58 each have a narrow vertical capillary reflux channel 85, defined by closely spaced (i.e., 2 mm) opposed walls 86 and 88 on the innards-side of the drainage slots 58. The lower discharge ends 91 of the vertical capillary reflux channels 85 are joined by a horizontal capillary reflux channel 90 which is formed between depending flanges 93 and 95 and serves to consolidate the reflux from the two vertical capillary reflux channels 86 into a single droplet. A pair of flat depending baffles 92 are provided immediately opposite, and closely spaced to, the slots 58 and serve to reduce entry of splashing/sloshing electrolyte into the apertures 58.

FIGS. 12–15 illustrate a preferred embodiment of the invention. This embodiment is essentially the same as that shown in FIG. 2–11 but with certain significant differences. Only the differences are described hereafter. The flat depending baffles 92 of the prior embodiment (see FIGS. 4 and 11) are replaced with L-shaped baffles 94 (see FIG. 14) for improved protection of the venting/draining slots 58 against electrolyte invasion. Moreover, the H-shaped baffle 64 (see FIG. 10) of the previous embodiment is replaced with a two-part baffle 96a and 96b. The lower part 96a of the baffle 96 is integral with, and upstands from, the inclined floor 56 of the sump 44, while the upper part 96b of the baffle 96 is integral with the final cover 8. The respective upper and lower parts join at the parting line between the intermediate and final covers and are thereat heat-sealed together. Being integral with the sump floor 56 eliminates any electrolyte creepage that might otherwise have occurred beneath the H-shaped baffle. Moreover, the new baffle 96 is V-shaped so as to offer a lesser impediment to electrolyte back flow toward the drainage slots 58. Still further, converging walls 98 are provided at the mouth of the sump 44 where the electrolyte flows back into the sump 4 from the antechamber 42. The converging walls 98 funnel the electrolyte toward a narrow gap 100 between the ends of the walls 98 which further inhibits electrolyte escape from the sump 44 into antechamber 42.

FIGS. 16-21 depict still another, and most preferred, embodiment wherein a lead-acid, SLI battery has an intermediate cover 6 and a final cover 8 defining six separate venting systems therebetween. The battery container 4 is partitioned (i.e., 5) so as to define six individual cell compartments 7 each housing one of six series connected cells for providing a 12-volt potential at the terminals 10. Each cell has its own individual venting system which is manifolded together with the other five systems so as to share common porous flame arrestors 26.

The intermediate cover 6 is sealed atop the container 4 and includes an upstanding wall 30 which defines the periphery of a rectangular enclosure for housing the battery's six venting systems (e.g., 14 and 16 shown). The wall 30 is heat sealed to depending peripheral flange 36 on the final cover 8 to complete the enclosure. Ridges 22 upstanding from the intermediate cover 6 divide the enclosure into six sections 28 each defining a separate venting system 14, 16, etc. and overlying an individual cell compartment 7. The several systems 14, 16, etc. each exhaust, and communicate one with the other, via notches 18 formed in the depending ridges 20 to cover 8. The depending ridges 20 are heat sealed (i.e., except for the notches 18) to the upstanding ridges 22 on the intermediate cover 6 and together define septums which separate the individual venting systems 14, 16, etc. one from the other. The several venting systems share (i.e., via the several notches 18) two atmospheric exhaust ports 24 which are contiguous the porous flame arrestors 26. Short upstanding hollow cylinders 33 define filler openings 34 and are heat sealed to mating depending cylinders 39 on final cover 8 to totally seal closed the electrolyte filler openings 34 (i.e., after filling) and thereby isolate them from the antechamber portions 42 of each venting system 14, 16, etc.

According to the FIGS. 16-21 embodiment, the dual compartment venting chamber comprises the antechamber 42 separated from a sump 44 by frontal partition 46 and lateral partition 52. The antechamber 42 has a canting floor 48 which slopes downwardly toward the sump 44. A narrow (i.e., about 2 mm wide) electrolyte-outflow-restricting slot 50 is provided in the lateral partition 52 which itself lies substantially parallel to the direction the canting floor 48 slopes. The slot 50 is located at substantially the low point 54 of the canting floor 48 to return any electrolyte in the antechamber 42 back to the sump 44 while still permitting the gases from the innards to concurrently vent therethrough countercurrent to the back flow of electrolyte. The sump 44: lies beneath the antechamber 42; is defined in part by the partitions 46 and 52; and includes an inclined floor 56 which slopes in the opposite direction to the canting floor 48 and away from the slot 50 toward a hole 51 at the low point thereof. At the slot 50, the inclined floor 56 is spaced from the canting floor 48 by a short distance so as to provide a riser 62 in the opposed lateral partition 52.

A tubular (i.e., cylindrical, rectangular, triangular, etc.) baffle 53 depends from the final cover 8 and extends into close fitting relation to, and slightly beneath, the hole 51. In this regard, an interference or near-interference fit is preferred between the baffle 53 and the rim of the hole 51 though a small clearance 55 is acceptable so long as it is not so large as to permit electrolyte from the innards to splash back therethrough. Narrow venting/draining apertures/slots 58 are provided in the sides of the baffle 53 at substantially the low point of the floor 56 and 90 degrees from the direction of downward flow of electrolyte from the slot 50 and serve to vent the gases from the innards while refluxing any electrolyte in the sump back thereto. The slots 58 are preferably about 1.7 mm wide at the rim of the hole 51 or of such other narrow width as will capillarily draw electrolyte from the inclined floor 56 down into the cell compartment 7. The FIGS. 16-21 design greatly simplifies the molding operation and reduces the incidence of molding flash formation at the several apertures/slots which can impede the back flow of electrolyte.

Figure 18:
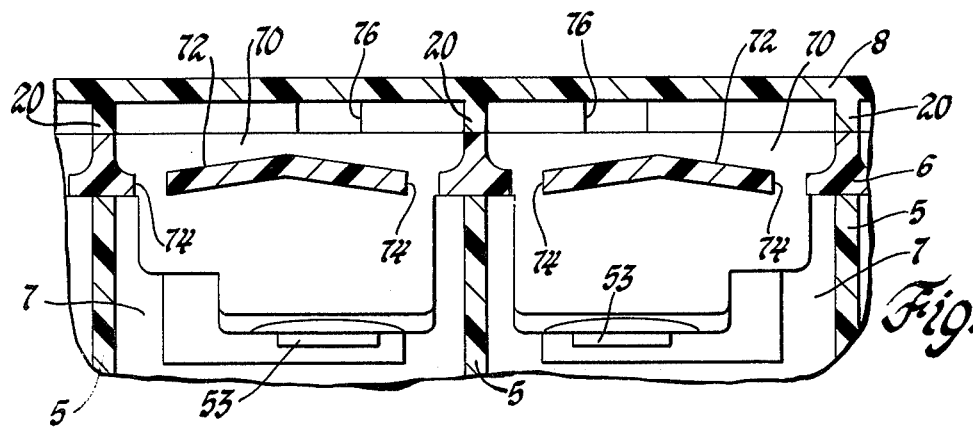
FIGS. 18-20 are front, sectioned views taken in the directions 18—18, 19—19 and 20—20 respectively of FIG. 16.
Figure 19:
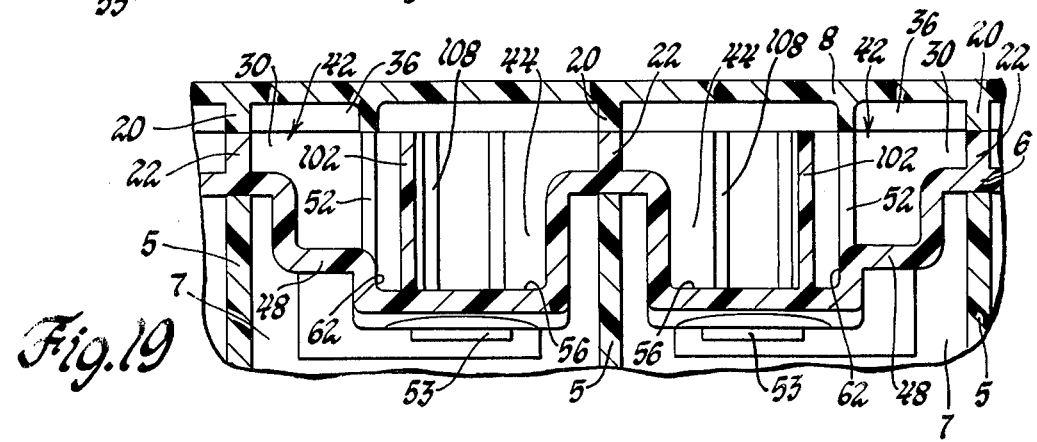
Figure 20:
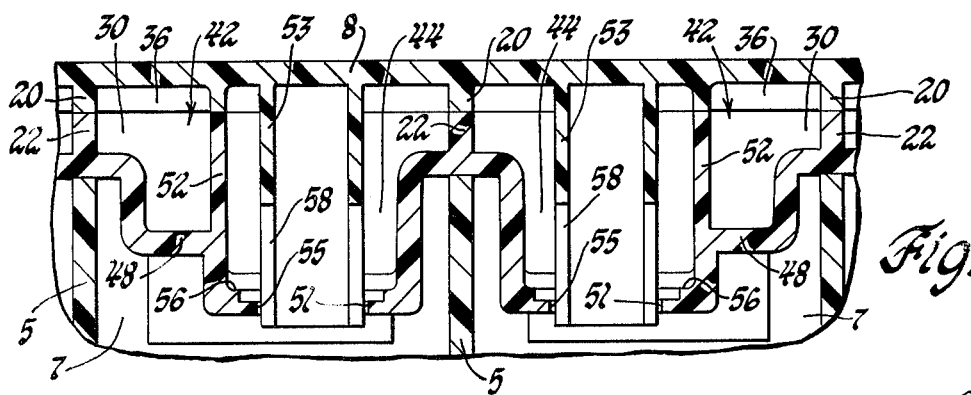
Figure 21:
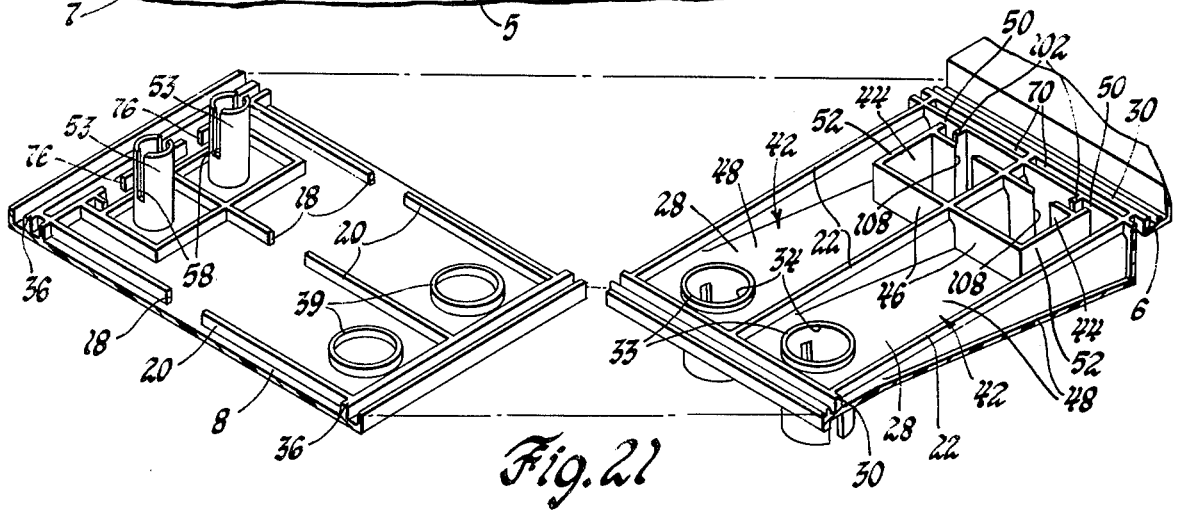
FIG. 21 is an exploded, isometric view of the venting system of FIGS. 16–20.

An air-bleed system (as best shown in FIG. 18) lies adjacent the sump 44. The air-bleed system includes a trough 70 having floor 72 which slopes in two directions toward air-bleed holes 74 at the lower ends thereof. A vent hole 76 above the trough 70 opens into the sump 44. The air-bleed system allows gas/air to escape from the cell compartment while electrolyte is refluxing through the drainage slots 58 or the battery is being filled. Any electrolyte that might perchance splash into the trough 70 will drain down the sloping floor 72 and back to the cell through the air-bleed holes 74.

A first wall 102 is provided immediately opposite the antechamber-sump slot 50 and serves not only as an electrolyte baffle means but also to define a capillary reflux channel 80 with the riser 62 for capillarily drawing any electrolyte from atop the floor 48 downwardly to the floor 56 of the sump 44. Additional vertical baffles 104 and 106 are spaced apart by a narrow opening 108 and serve to restrict the movement of electrolyte upwardly from the drainage apertures 58 toward the antechamber-sump slot 50.

By utilizing the principles of the present invention it has been possible: to produce venting systems which are at least 10 mm shallower than used in the assignee's prior commercial products; and at the same time to reduce the tendency of the battery to leak by at least 10 times (i.e., based on standard shaker and vibration tests of batteries tilted 20° toward the flame arrestor).

While this invention has been disclosed primarily in terms of specific embodiments thereof it is not intended to be limited thereto but rather only to the extent set for the in the claims which follow.

The embodiments of the invention in which an exclusive property or privilege is claimed are defined as follows:

1. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:
   an electrolyte drainage aperture for refluxing electrolyte to said innards;
   an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward said aperture in a direction substantially different than said first direction;

partition means extending from and above said inclined and canted floors, said partition means further defining said sump and separating it from said antechamber and said innards; and a substantially vertical slot in said partition means at substantially said low point of said canted floor for providing flow communication between said sump and said antechamber, said slot being sufficiently narrow as to permit egress of gas from said sump and regress of electrolyte to said sump but inhibit egress of electrolyte from said sump;

whereby any electrolyte invading said sump from said innards must first travel upwardly in one direction along said inclined floor, traverse said slot, and then travel upwardly along said canted floor in a substantially different direction before sufficiently nearing said exhaust port to permit possible escape therethrough.

2. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward said aperture in a direction substantially different than said first direction;

partition means extending from and above said inclined and canted floors, said partition means further defining said sump and separating it from said antechamber and said innards;

a substantially vertical slot in said partition means at substantially said low point of said canted floor for providing flow communication between said sump and said antechamber, said slot being sufficiently narrow as to permit egress of gas from said sump and regress of electrolyte to said sump but inhibit egress of electrolyte from said sump; and baffle means transverse said sump between said aperture and said slot to deflect electrolyte moving between said aperture and said slot;

whereby any electrolyte invading said sump from said innards via said aperture must first travel upwardly in one direction along said inclined floor, circumvent said baffle means, traverse said slot, and then travel upwardly along said canted floor in a substantially different direction before sufficiently nearing said exhaust port to permit possible escape therethrough.

3. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward said aperture in a direction substantially different than said first direction;

partition means extending substantially vertically from and above said inclined and canted floors to further define said sump and separate it from said antechamber and said innards, said partition means including portions lying in planes substantially parallel to said first direction; and a substantially vertical slot in each of said portions at substantially said low point of said canted floor for providing flow communication between said sump and said antechamber, said slots being sufficiently narrow as to permit egress of gas from said sump and regress of electrolyte to said sump but inhibit egress of electrolyte from said sump;

whereby any electrolyte invading said sump from said innards must first travel upwardly in one direction along said inclined floor, change direction to traverse said slots, and then travel upwardly along said canted floor in still another direction before sufficiently nearing said exhaust port to permit possible escape therethrough.

4. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward an electrolyte outflow restricting slot at substantially the low point of said canted floor for communicating said antechamber with a sump;

a sump depending from said canted floor between said aperture and said slot, said sump being defined in part by an inclined floor which slopes downwardly toward said aperture in a direction substantially different than said first direction;

partition means extending from and above said inclined and canted floors to further define said sump and separate it from said antechamber and said innards, said partition means including a riser portion between said slot and said inclined floor;

whereby any electrolyte invading said sump from said innards must first travel upwardly in one direction along said inclined floor, climb said riser in another direction, traverse said slot in still a third direction, and finally travel upwardly along said canted floor in but a forth direction before sufficiently nearing said exhaust port to permit possible escape therethrough.

5. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;
an exhaust port for passing said gases to the ambient;
an antechamber adjacent said exhaust port, said antechamber being defined in part by a canted floor sloping downwardly from said port in a first direction toward an electrolyte outflow restricting opening at substantially the low point of said canted floor for communicating said antechamber with a sump;
a sump depending from said canted floor between said aperture and said opening, said sump being defined in part by an inclined floor which slopes downwardly toward said aperture in a direction substantially different than said first direction;
partition means extending from and above said inclined and canted floors, to separate said sump from said antechamber and said innards, said partition means including a riser portion extending between said opening and said inclined floor; and
means associated with said opening and said riser for capillarily refluxing any electrolyte on said canted floor at said low point back into said sump for ultimate return to said innards through said aperture.

6. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;
an exhaust port for passing said gases to the ambient;
an antechamber adjacent said exhaust port, said antechamber being defined in part by a canted floor sloping downwardly from said port in a first direction toward a sump;
a sump at substantially the low point of said canted floor, said sump being defined in part by an inclined floor lying beneath said canted floor and sloping downwardly toward said aperture in a direction substantially different than said first direction;
partition means extending from and above said inclined and canted floors to further define said sump and separate it from said antechamber and said innards;
a substantially vertical slot in said partition means at substantially said low point of said canted floor for providing flow communication between said sump and said antechamber, said slot being sufficiently narrow as to permit egress of gas from said sump and regress of electrolyte to said sump but inhibit egress of electrolyte from said sump; and
means associated with said aperture for capillarily refluxing any electrolyte in said sump back into said innards.

7. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;
an exhaust port for passing said gases to the ambient;
an antechamber adjacent said exhaust port, said antechamber being defined in part by a canted floor sloping downwardly from said port in a first direction toward an electrolyte outflow restricting opening at substantially the low point of said canted floor for communicating said antechamber with a sump;
a sump depending from said canted floor between said aperture and said opening, said sump being defined in part by an inclined floor which slopes downwardly toward said aperture in a direction substantially different than said first direction;
partition means extending from and above said inclined and canted floors to separate said sump from said antechamber and said innards, said partition means including a riser extending between said opening and said inclined floor;
means associated with said opening and said riser for capillarily refluxing any electrolyte on said canted floor at said low point back into said sump; and
means associated with said aperture for capillarily refluxing any electrolyte in said sump back into said innards.

8. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;
an exhaust port for passing said gases to the ambient;
an antechamber adjacent said exhaust port, said antechamber being defined in part by a canted floor sloping downwardly from said port in a first direction toward a sump;
a sump at substantially the low point of said canted floor, said sump being defined in part by an inclined floor lying beneath said canted floor and sloping downwardly toward at least two said apertures in a direction substantially different than said first direction;
partition means extending substantially vertically from and above said inclined and canted floors for further defining said sump and separating it from said antechamber and said innards, said partition means including a pair of opposed walls each lying in a plane substantially parallel to said first direction and having a said aperture therein at substantially the low point of said inclined floor and an electrolyte outflow restricting vertical slot therein at substantially the low point of said canted floor for communicating said antechamber with said sump; and
means substantially vertically associated with each of said apertures and said opposed walls for capillarily refluxing any electrolyte in said sump back into said innards.

9. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward at least two of said apertures in a direction substantially different than said first direction;

partition means extending substantially vertically from and above said inclined and canted floors for further defining said sump and separating it from said antechamber and said innards, said partition means including a pair of opposed walls each lying in a plane substantially parallel to said first direction and having an elongated vertical aperture therein at substantially the low point of said inclined floor and an electrolyte outflow restricting vertical slot therein at substantially the low point of said canted floor for communicating said antechamber with said sump;

means substantially vertically associated with each of said apertures and said opposed walls for capillarily refluxing any electrolyte in said sump back into said innards, said capillary refluxing means having an inlet end at said aperture and a discharge end below said aperture; and means extending substantially horizontally between said discharge ends for capillarily consolidating the reflux from said apertures into single droplet for return to the innards.

10. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward said aperture in a direction substantially different than said first direction;

partition means extending from and above said inclined and canted floors to further define said sump and separate it from said antechamber and said innards;

an opening in said partition means at substantially said low point of said canted floor for providing flow communication between said sump and said antechamber, said opening being sufficiently small as to permit egress of gas from said sump and regress of electrolyte to said sump but inhibit egress of electrolyte from said sump; and means associated with said aperture for capillarily refluxing any electrolyte in said sump back into said innards.

11. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamer being defined in part by a canted floor sloping downwardly from said port in a first direction toward a sump;

a sump at substantially the low point of said canted floor, said sump being defined in part by an inclined floor lying beneath said canted floor and sloping downwardly toward at least two said apertures in a direction substantially different than said first direction;

partition means extending substantially vertically from and above said inclined and canted floors for further defining said sump and separating it from said antechamber and said innards, said partition means including a pair of opposed walls each lying in a plane substantially parallel to said first direction and having an elongated said aperture vertically disposed therein at substantially the low point of said inclined floor and an electrolyte outflow restricting vertical slot therein at substantially the low point of said canted floor for communicating said antechamber with said sump; and means substantially vertically associated with each of said elongated apertures and said opposed walls for capillarily refluxing any electrolyte in said sump back into said innards.

12. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward at least two said apertures in a direction substantially different than said first direction;

partition means extending substantially vertically from and above said inclined and canted floor to further define said sump and separate it from said antechamber and said innards, said partition means including a pair of opposed walls each lying in a plane substantially parallel to said first direction and having one of said apertures therein; and a substantially vertical slot in each of said opposed walls at substantially said low point of the canted floor for providing flow communication between said sump and said antechamber, said slot being sufficiently narrow as to permit egress of gas from said sump and regress of electrolyte to said sump but inhibit egress of electrolyte from said sump;

whereby any electrolyte invading said sump from said innards must first travel upwardly in one directon along said inclined floor, change direction to traverse said slot, and then travel upwardly along said canted floor in still another direction before sufficiently nearing said exhaust port to permit possible escape from said battery therethrough.

13. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward an electrolyte outflow restricting opening at substantially the low point of said canted floor for communicating said antechamber with a sump;

a sump depending from said canted floor between said aperture and said opening, said sump being defined in part by an inclined floor which slopes downwardly toward said aperture in a direction substantially different than said first direction;

partition means extending from and above said inclined and canted floors to separate said sump from said antechamber and said innards, said partition means including a riser portion extending between said opening and said inclined floor; and means extending along said opening and down said riser to define a narrow channel for capillarily refluxing any electrolyte on said canted floor at said low point back into said sump for ultimate return to said innards through said aperture.

14. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward an electrolyte outflow restricting opening at substantially the low point of said canted floor for communicating said antechamber with a sump;

a sump depending from said canted floor between said aperture and said opening, said sump being defined in part by an inclined floor which slopes downwardly toward said aperture in a direction substantially different than said first direction;

partition means extending from and above said inclined and canted floors to separate said sump from said antechamber and said innards, said partition means including a riser extending between said opening and said inclined floor;

means extending along said opening and down said riser to define a narrow channel for capillarily refluxing any electrolyte on said canted floor at said low point back into said sump; and means flanking said aperture to define a narrow channel on the innards side of said wall for capillarily refluxing any electrolyte in said sump back into said innards.

15. An electric storage battery comprising a case for housing the battery's active elements, a cover secured to said case and a horizontal-type vent system formed in said cover for relieving gases from the innards of the battery while inhibiting electrolyte escape therefrom wherein said vent system comprises:

an electrolyte drainage aperture for refluxing electrolyte to said innards;

an exhaust port for passing said gases to the ambient;

an antechamber adjacent said exhaust port, said antechamber being defined in part by a canted floor sloping downwardly from said port in a first direction toward a sump;

a sump at substantially the low point of said canted floor, said sump being defined in part by an inclined floor lying beneath said canted floor and sloping downwardly toward said aperture in a direction substantially different than said first direction;

partition means extending substantially vertically from and above said inclined and canted floors to further define said sump and separate it from said antechamber and said innards, said partition means including at least one wall lying in a plane substantially parallel to said first direction and having said aperture therein;

an opening in said wall at substantially said low point of said canted floor for providing flow communication between said sump and said antechamber, said opening being sufficiently small as to permit egress of gas from said sump and regress of electrolyte to said sump but inhibit egress of electrolyte from said sump; and means flanking said aperture to define a narrow channel on the innards side of said wall for capillarily refluxing any electrolyte in said sump back into said innards.

16. An electric storage battery comprising a case for housing the battery's active elements, a first cover secured to said case, a second cover secured to said first cover and a horizontal-type vent system formed in between said covers for relieving gases from the innards of the battery while inhibiting electrolyte escape therefrom wherein said vent system comprises:

an exhaust port for passing said gases to the ambient;

an antechamber adjacent said exhaust port, said antechamber being defined in part by canted floor sloping downwardly from said port in a first direction toward an electrolyte outflow restricting opening at sustantially the low point of said canted floor for communicating said antechamber with a sump;

a sump depending from said canted floor said sump being defined in part by an inclined floor which slopes downwardly away from said opening in a direction substantially different than said first direction;

a hole at substantially the low point of said inclined floor;

a tubular baffle depending from said second cover and extending in close-fitting relation through said hole so as to project into said innards from beneath said sump;

an electrolyte drainage slot in said baffle adjacent said hole for refluxing electrolyte to said innards;

partition means extending from and above said inclined and canted floors to separate said sump from said antechamber and said innards, said partition means including a riser extending between said opening and said inclined floor; and means associated with said opening and said riser for capillarily refluxing any electroyte on said canted floor at said low point back into said sump.

17. An electric storage battery comprising a case for housing the battery's active elements, a first cover secured to said case, a second cover secured to said first cover and a horizontal-type vent system formed in between said cover for relieving gases from the innards of the battery while inhibiting electrolyte escape therefrom wherein said vent system comprises:

an exhaust port for passing said gases to the ambient;

an antechamber adjacent said exhaust port, said antechamber being defined in part by canted floor sloping downwardly from said port in a first direction toward an electrolyte outflow restricting opening at substantially the low point of said canted floor for communicating said antechamber with a sump;

a sump depending from said canted floor said sump being defined in part by an inclined floor which slopes downwardly away from said opening in a direction substantially different than said first direction;

a hole at substantially the low point of said inclined floor;

a tubular baffle depending from said second cover and extending in close-fitting relation through said hole so as to project into said innards from beneath said sump;

an electrolyte drainage slot in said baffle adjacent said hole said slot being so sized as to capillarily reflux any electrolyte on said inclined floor back into said innards;

partition means extending from and above said inclined and canted floors to separate said sump from said antechamber and said innards, said partition means including a riser extending between said opening and said inclined floor; and means associated with said opening and said riser for capillarily refluxing any electroyte on said canted floor at said low point back into said sump.

* * * * *